(12) United States Patent
Baker et al.

(10) Patent No.: US 6,537,515 B1
(45) Date of Patent: Mar. 25, 2003

(54) CRYSTALLINE GRAPHITE NANOFIBERS AND A PROCESS FOR PRODUCING SAME

(75) Inventors: R. Terry K. Baker, Mansfield, MA (US); Nelly M. Rodriguez, Mansfield, MA (US)

(73) Assignee: Catalytic Materials LLC, Holliston, MA (US)

( * ) Notice: Subject to any disclaimer, the term of this patent is extended or adjusted under 35 U.S.C. 154(b) by 144 days.

(21) Appl. No.: 09/659,441

(22) Filed: Sep. 8, 2000

(51) Int. Cl.$^7$ .................................................. D01R 9/12
(52) U.S. Cl. ..................................................... 423/447.3
(58) Field of Search ....................................... 423/447.3

(56) References Cited

U.S. PATENT DOCUMENTS 5,618,875 A * 4/1997 Baker et al. ................. 524/495

* cited by examiner

*Primary Examiner*—Stuart L. Hendrickson
(74) *Attorney, Agent, or Firm*—Henry E. Naylor

(57) ABSTRACT

A process for producing substantially crystalline graphitic carbon nanofibers comprised of graphite sheets. The graphite sheets are substantially perpendicular to the longitudinal axis of the carbon nanofiber. These carbon nanofibers are produced by contacting an iron:copper bimetallic bulk catalyst with a mixture of carbon monoxide and hydrogen at temperatures from about 550° C. to about 670° C. for an effective amount of time.

9 Claims, No Drawings

CRYSTALLINE GRAPHITE NANOFIBERS AND A PROCESS FOR PRODUCING SAME

BACKGROUND OF THE INVENTION

1. Field of the Invention

This invention relates to a process for producing substantially crystalline graphitic carbon nanofibers comprised of graphite sheets. The graphite sheets are substantially perpendicular to the longitudinal axis of the carbon nanofiber. These carbon nanofibers are produced by contacting an iron:copper bimetallic bulk catalyst with a mixture of carbon monoxide and hydrogen at temperatures from about 550° C. to about 670° C. for an effective amount of time.

2. Description of Related Art

Nanostructure materials, particularly carbon nanostructure materials, are quickly gaining importance for various potential commercial applications. Such applications include their use to store molecular hydrogen, serve as catalyst supports, as reinforcing components for polymeric composites and to be useful in various batteries. Carbon nanostructure materials are typically prepared from the decomposition of carbon-containing gases over selected catalytic metal surfaces at temperatures ranging from about 500° to about 1,200° C.

For example, U.S. Pat. Nos. 5,149,584 and 5,618,875, to Baker et al., teach carbon nanofibers as reinforcing components in polymer reinforced composites. The carbon nanofibers can either be used as is or as part of a structure comprised of carbon fibers having carbon nanofibers grown therefrom. The examples of these patents show the preparation of various carbon nanostructures by the decomposition of a mixture of ethylene and hydrogen in the presence of metal catalysts such as iron, nickel, a nickel:copper alloy, an iron:copper alloy, etc. Also,U.S. Pat. No. 5,413,866, to Baker et al., teaches carbon nanostructures characterized as having: (i) a surface area from about 50 $m^2/g$ to 800 $m^2/g$; (ii) an electrical resistivity from about 0.3 $\mu$ohm·m to 0.8 $\mu$ohm·m; (iii) a crystallinity from about 5% to about 100%; (iv) a length from about 1 $\mu$m to about 100 $\mu$m; and (v) a shape that is selected from the group consisting of branched, spiral, and helical. These carbon nanostructures are taught as being prepared by depositing a catalyst containing at least one Group IB metal, and at least one other metal, on a suitable refractory support and then subjecting the catalyst-treated support to a carbon-containing gas at a temperature from the decomposition temperature of the carbon-containing gas to the deactivation temperature of the catalyst.

U.S. Pat. No. 5,458,784, also to Baker et al., teaches the use of the carbon nanostructures of U.S. Pat. No. 5,413,866 for removing contaminants from aqueous and gaseous steams; and U.S. Pat. No. 5,653,951, to Rodriguez et al., discloses and claims that molecular hydrogen can be stored in layered nanostructure materials having specific distances between layers. The examples of these patents teach the aforementioned preparation methods as well as the decomposition of a mixture of carbon monoxide and hydrogen in the presence of an iron powder catalyst at 600° C. All of the above referenced U.S. patents are incorporated herein by reference.

While various carbon nanostructures and their uses are taught in the art, there is still a need for improvements before such nanostructure materials can reach their full commercial and technical potential. For example, while the art broadly discloses carbon nanostructures having crystallinities from about 5 to 95%, it has heretofore not been possible to produce carbon nanostructures with crystallinities greater than about 95%.

SUMMARY OF THE INVENTION

In accordance with the present invention, there is provided a substantially crystalline graphitic carbon nanofibers comprised of graphite sheets that are substantially perpendicular to its longitudinal axis of the nanofibers, wherein the distance between graphite sheets is from about 0.335 nm to about 0.67 nm, and having a crystallinity greater than about 95%.

In a preferred embodiment, the distance between the graphite sheets is from about 0.335 and 0.40 nm.

Also in accordance with the present invention, there is provided a process of producing substantially crystalline graphitic carbon nanofibers which process comprises reacting a mixture of $CO/H_2$ in the presence of a powder Fe:Cu bimetallic catalyst for an effective amount of time at a temperature from about 550° C. to about 670° C.

In a preferred embodiment, the ratio of Fe to Cu is from about 5:95 to about 95:5 and the ratio of CO to $H_2$ is from about 95:5 to about 5:95, preferably from about 80:20 to about 20:80.

DETAILED DESCRIPTION OF THE INVENTION

The carbon nanofibers of the present invention possess a novel structure in which graphite sheets, constituting the material, are aligned in a direction that is substantially perpendicular to the growth axis (longitudinal axis) of the nanofiber. The carbon nanfibers are sometimes referred to herein as "platelet" nanofibers. In addition, the nanofibers have a unique set of properties, which include: (i) a nitrogen surface area from about 40 to 120 $m^2/g$; (ii) an electrical resistivity of 0.4 ohm·cm to 0.1 ohm·cm; (iii) a crystallinity from about 95% to 100%; and (iv) a spacing between adjacent graphite sheets of 0.335 nm to about 1.1 nm, preferably from about 0.335 nm to about 0.67 nm, and more preferably from about 0.335 to about 0.40 nm.

The catalysts used to prepare the carbon nanofibers of the present invention are iron:copper bulk bimetallic catalysts in powder form. It is well established that the ferromagnetic metals, iron, cobalt and nickel, are active catalysts for the growth of carbon nanofibers during decomposition of certain hydrocarbons or carbon monoxide. Efforts are now being directed at modifying the catalytic behavior of these metals, with respect to nanofiber growth, by introducing other metals and non-metals into the system.

In this respect, copper is an enigma, appearing to be relatively inert towards carbon deposition during the $CO/H_2$ reaction. Thus, it is unexpected that the combination of Cu with Fe has such a dramatic effect on carbon nanofiber growth in the $CO/H_2$ system.

The average powder particle size of the metal catalyst will range from about 0.5 nanometer to about 5 micrometer, preferably from about 2.5 nanometer to about 1 micrometer. The ratio of the two metals can be any effective ratio that will produce substantially crystalline carbon nanofibers in which the graphite sheets are substantially perpendicular to the longitudinal axis of the nanofiber, at temperatures from about 550° C. to about 670° C. in the presence of a mixture of $CO/H_2$. The ratio of iron:copper will, typically, be from about 5:95 to about 95:5, preferably from about 3:7 to about 7:3; and more preferably from about 6:4 to about 7:3. The bimetallic catalyst can be prepared by any suitable technique. One preferred technique is by co-precipitation of aqueous solutions containing soluble salts of the two metals. Preferred salts include the nitrates, sulfates, and chlorides of iron and copper, particularly iron nitrate and copper nitrate. The resulting precipitates are dried and calcined to convert the salts to the mixed metal oxides. The calcined metal powders are then reduced at an effective temperature and for an effective time.

The iron:copper catalyst powders used in the present invention are prepared by the co-precipitation of aqueous solutions containing appropriate amounts of nickel and copper nitrate using ammonium bicarbonate. The precipitates were dried overnight at the 110° C. before being calcined in air at 400° C. to convert the carbonates into mixed metal oxides. The calcined powders were then reduced in hydrogen for 20 hours at 400° C. Following this treatment, the reduced catalyst was cooled to room temperature in a helium environment before being passivated in a 2% oxygen/helium mixture for 1 hour at about room temperature (24° C.).

Gas flow reactor experiments were carried out in a horizontal quartz tube (40 mm i.d. and 90 cm ong) contained in a Linberg tube furnace, at temperatures over the range of about 450° C. to 700° C. Gas flow rates to the reactor were regulated by MKS mass flow controllers. In a typical experiment, 50 mg of the given catalyst powder was dispersed in a substantially uniform manner along the base of a ceramic boat, which was subsequently placed at the center of the reactor tube. After reduction of the sample at 600° C. for 2 hours, the system was flushed with helium and brought to the desired temperature level before being reacted with in the $CO/H_2$ mixture for a period of 2 hours. The total amount of solid carbon formed in any given experiment was determined at the completion of the reaction by weight difference. The composition of the gas phase was measured at regular intervals by taking samples of the inlet and outlet streams which were then analyzed by gas chromatography using a 30 m megabore (CS-Q) capillary column in a Varian 3400 GC unit. Carbon and hydrogen atom balances, in combination with the relative concentrations of the respective components, were applied to obtain the various product yields. In order to obtain reproducible carbon deposition data, it was necessary to follow an identical protocol for each experiment.

The structural details of the carbon materials, resulting from the interaction of the $CO/H_2$ mixtures with the various powdered bimetallic catalysts, were examined in a JEOL 2000 EX II transmission electron microscope that was fitted with a high resolution pole piece capable of providing a lattice resolution of 0.18 nm. Temperature programmed oxidation studies (TPO) of the various carbon materials were carried out in a Cahn 2000 microbalance in the presence of a $CO_2/Ar$ (1:1) mixture at a heating rate of 5°/min up to a maximum of a given carbon deposit from a comparison the oxidation profile with those of two standard materials, amorphous carbon and single crystal graphite when treated under the same conditions.

It is known that, carbon nanostructures can be prepared by reacting a catalyst in a heating zone with the vapor of a suitable carbon-containing compound. While the art teaches a wide variety of carbon-containing compounds as being suitable, the inventors hereof have found that only a mixture of CO and $H_2$ will yield carbon nanofibers with unexpected high crystallinities. That is, crystallinities greater than about 95%, preferably greater than 97%, more preferably greater than 98%, and most preferably substantially 100%.

After the nanofibers are grown, it may be desirable to treat them with an aqueous solution of an inorganic acid, such as a mineral acid, to remove any excess catalyst particles. Non-limiting examples of suitable mineral acids include sulfuric acid, nitric acid and hydrochloric acid. Preferred is sulfuric acid.

It is within the scope of this invention to increase the spacing between the graphite sheets by any suitable means, such as by intercalation. Intercalation involves incorporating an appropriate intercalation compound between platelets. Intercalation compounds suitable for graphite structures are comprehensively discussed in *Applications of Graphite Intercalation Compounds*, by M. Inagaki, Journal of Material Research, Vol 4, No.6, Nov/Dec 1989, which is incorporated herein by reference. The preferred intercalation compounds for use with the nanofibers of the present invention are alkali and alkaline-earth metals. The limit to which the platelet spacing will be increased for purposes of the present invention will be that point wherein the carbon nanofibers no longer can be characterized as graphitic. That is, the spacing can become so large the the carbon now has properties more like amorphorous carbon instead of graphite. It is important for the practice of the present invention that the carbon nanofibers maintain the basal plane structure representative of graphite.

A major advantage of the graphite nanofibers of the present invention, over other graphitic materials, is their flexibility with regard to modification of surface chemistry. For example, the edge regions of the nanofibers can be made either basic (introduction of $NH_4^+$ groups) or acidic (addition of $COOH^-$ groups) by use of appropriate methods. Furthermore, the presence of oxygenated groups (hydroxyl, peroxide, ether, keto or aldehyde), that are neither acidic nor basic in nature, can impart polarity to the graphite structure. Polar groups will promote the interaction of carbon edge atoms with other polar groups such as water. As a consequence, the interaction of graphitic materials with aqueous solutions can be greatly enhanced due to the presence of acid, basic or neutral functionality.

The distribution of polar groups in active carbon (non-graphitic) occurs in a random fashion, whereas in materials such as the graphite nanofibers of the present invention, such sites are always located at the edges of the graphene layers. Addition of oxygenated groups can be achieved by selected oxidation treatments including treatment in peroxides, nitric acid, potassium permanganate, etc. Polar sites can also be eliminated by reduction, out-gassing in vacuum at 1000° C. or treatment in hydrazine at 80° C. Following this procedure, the graphite nanofiber will become hydrophobic. Theodoridou and coworkers, (Met. 14, 125 (1986)), demonstrated that very efficient surface oxidation of carbon fibers can be achieved by d.c. oxidation or repetitive anodic oxidation and cathodic reduction of the material in acidic, alkaline or neutral aqueous media. It was believed that this method had the advantage over other procedures in that thick layers of surface oxides could be produced without damaging the fiber structure. These workers also capitalized on the conductive properties of graphitized carbon fibers to introduce various noble metals onto such materials via the use of electrochemical procedures. The possibility of controlling the functionality of the graphite surface could have a direct impact on both the chemistry of the supported metal particles and their morphological characteristics.

The present invention will be illustrated in more detail with reference to the following examples, which should not be construed to be limiting in scope of the present invention.

EXAMPLE 1

In the first set of experiments selected Fe:Cu catalysts were heated in the presence of a $CO/H_2$ (4:1) mixture at temperatures ranging from 450° C. to 700° C. Table I below shows the number of grams of carbon nanofibers per weight of catalyst produced after a period of 2 hours at each temperature. In each case, the optimum yield of carbon nanofibers was generated at temperatures between 550° C. and 600° C. The most active catalysts were those that contained a larger fraction of iron than copper.

TABLE I

Effect of Temperature on the amount of Carbon Nanofibers (grams/grams of Catalyst) from the Decomposition of $CO/H_2$ over selected Fe:Cu Powders

| Temperature (° C.) | Fe:Cu (1:9) | Fe:Cu (3:7) | Fe:Cu (7:3) |
|---|---|---|---|
| 450 | 1.10 | 1.15 | 1.31 |
| 500 | 2.55 | 4.15 | 10.83 |
| 525 | 4.48 | | |
| 550 | 6.14 | 9.81 | 12.02 |
| 600 | 7.86 | 10.15 | 11.55 |
| 625 | 5.07 | | |
| 650 | 3.72 | 4.21 | 4.40 |
| 700 | 1.24 | 1.15 | 1.31 |

EXAMPLE 2

A second series of experiments was carried out at 550° C. under conditions where selected Fe:Cu catalysts were heated in $CO/H_2$ mixtures in which the percent of $H_2$ was progressively increased. The data presented in Table II below shows that the number of grams of carbon nanofibers per weight of catalyst produced after 2.5 hours reached a maximum for each system when the reactant gas contained between 20 to 50% of hydrogen.

TABLE II

Effect of Percent $H_2$ in the $CO/H_2$ reactant mixture on the amount of Carbon Nanofibers (grams/grams of Catalyst) formed over Fe:Cu Catalysts at 550° C.

| Catalyst | 20% $H_2$ | 50% $H_2$ | 80% $H_2$ |
|---|---|---|---|
| Pure Fe | 17.53 | 16.86 | 14.16 |
| Fe—Cu (7:3) | 16.63 | 17.23 | 12.96 |
| Fe—Cu (5:5) | 16.41 | 15.74 | 12.14 |
| Fe—Cu (3:7) | 13.78 | 13.71 | 12.51 |
| Fe—Cu (1:9) | 8.7 | 10.41 | 10.79 |

EXAMPLE 3

Another set of experiments was performed at 600° C. under conditions where selected Fe:Cu catalysts were heated in $CO/H_2$ mixtures in which the percent of $H_2$ was progressively increased. The data presented in Table III below shows that in this case the number of grams of carbon nanofibers per weight of catalyst produced after 2.5 hours reached a maximum for each system when the reactant gas contained 20% of hydrogen.

TABLE III

Effect of Percent $H_2$ in the $CO/H_2$ reactant mixture on the amount of Carbon Nanofibers (grams/grams of Catalyst) formed over Fe:Cu Catalysts at 600° C.

| Catalyst | 20% $H_2$ | 33% $H_2$ | 50% $H_2$ | 67% $H_2$ | 80% $H_2$ |
|---|---|---|---|---|---|
| Fe—Cu (1:9) | 7.86 | 7.37 | 7.11 | 5.26 | 3.96 |
| Fe—Cu (3:7) | 10.15 | 8.91 | 7.44 | 6.35 | 4.05 |
| Fe—Cu (7:3) | 11.85 | 9.33 | 8.99 | 4.77 | 3.23 |

EXAMPLE 4

In a set of experiments carried out at 600° C. for 2 hours, it was found that the number of grams of carbon nanofibers per weight of catalyst produced after 2.5 hours with a $CO/H_2$ mixture was dependent upon the percentage of copper in the Fe:Cu bimetallic catalyst. It can be seen from Table IV below that, as the fraction of copper exceeds 40% there is a gradual decrease in carbon nanofiber yield. It can also be seen that, a catalyst containing pure copper does not produce carbon nanofibers.

TABLE IV

The effect of catalyst composition on carbon nanofiber formation from the Fe—Cu catalyzed decomposition of $CO/H_2$ (4:1) after 1.0 hours at 600° C.

| % Copper in catalyst | Grams of carbon nanofibers/grams catalyst |
|---|---|
| 0 | 8.8 |
| 30 | 11.65 |
| 50 | 11.60 |
| 70 | 10.25 |
| 80 | 9.10 |
| 90 | 7.35 |
| 95 | 4.70 |
| 100 | 0 |

EXAMPLE 5

In a further set of experiments, the overall degree of crystallinity of the carbon nanofibers produced from the interaction of selected Fe:Cu catalysts with a $CO/H_2$ (4:1) mixture at 600° C. for 2.0 hours was determined from temperature programmed oxidation of the nanofibers in $CO_2$. The characteristics of the controlled gasification of carbonaceous solids in $CO_2$ provides a sensitive method of determining the structural perfection of such materials. The data shown in Table V below indicates that the degree of crystallinity of carbon nanofibers generated from an Fe—Cu (7:3) catalyst is significantly higher than that of the same type of nanofibers grown under identical reaction conditions on a pure iron catalyst.

TABLE V

Percent reactivity of carbon nanofibers in $CO_2$ as a function of reaction temperatures

| Carbon Material | 805° C. | 900° C. | 950° C. | 1000° C. | 1050° C. |
|---|---|---|---|---|---|
| Nanofibers from Fe | 29.1% | 52.0% | 72.8% | 86.2% | 100.0% |
| Nanofibers from Fe—Cu (7:3) | 5.2% | 12.8% | 30.6% | 57.0% | 100.0% |

EXAMPLE 6

In a further set of experiments, the overall degree of crystallinity of the carbon nanofibers produced from the interaction of iron-copper (7:3) catalysts with a $CO/H_2$ (4:1) mixture at temperatures ranging from 550 to 675° C. for 2.0 hours was determined from temperature programmed oxidation of the materials in $CO_2$. The data shown in Table VI below indicate that the degree of crystallinity of carbon nanofibers generated from an Fe—Cu (7:3) catalyst at 600° C. is significantly higher than that of the nanofibers grown at lower or higher temperatures.

TABLE VI

Percent reactivity of carbon nanofibers grown from Fe—Cu (7:3) catalyzed decomposition of CO/H$_2$ (4:1) at various conditions in CO$_2$ as a function of reaction temperature

| Nanofiber Growth Temperature | 805° C. | 900° C. | 950° C. | 1000° C. | 1050° C. |
|---|---|---|---|---|---|
| 550° C. | 5.4% | 7.8% | 44.1% | 83.8% | 100.0% |
| 600° C. | 5.2% | 12.8% | 30.6% | 57.0% | 100.0% |
| 675° C. | 14.0% | 55.1% | 96.2% | 100.0% | |

EXAMPLE 7

In a series of characterization studies, performed in a high resolution transmission electron microscope, small sections of carbon nanofibers grown from the decomposition of CO/H$_2$ mixtures at 600° C. over various metal and bimetallic catalyst systems were examined and representative micrographs taken of each sample. A compilation of the observations made from inspection of several micrographs from each sample is given in Table VII below. Also included, for comparison purposes, are corresponding data for nanofibers grown from the interaction of the same series of catalysts with C$_2$H$_4$/H$_2$ at 600° C.

TABLE VII

Comparison of structural features of carbon nanofibers from the decomposition of CO/H$_2$ (4:1) and C$_2$H$_4$/H$_2$ (4:1) over various metal and bimetallic catalysts at 600° C.

| | Nanofiber Structure | |
|---|---|---|
| Catalyst | C$_2$H$_4$/H$_2$ | CO/H$_2$ |
| Fe | No nanofiber growth | Platelet |
| Ni | Straight amorphous nanofibers | No nanofiber growth |
| Co | Straight amorphous nanofibers | No nanofiber growth |
| Fe—Ni | Straight coiled & branched "herring-bone" | Tubular, ribbon |
| Ni—Cu | Straight coiled & branched "herring-bone" | No nanofiber growth |
| Co—Cu | Amorphous straight, Coiled & branched | No nanofiber growth |
| Fe—Cu | Straight coiled & branched "herring-bone" | Platelet |

A carbon nanofiber having graphite sheets at an angle to the longitudinal axis of the nanofiber is referred to as a "herringbone structure".

EXAMPLE 8

In another series of characterization studies, performed in a high-resolution transmission electron microscope, samples of carbon nanofibers grown from the decomposition of CO/H$_2$ mixtures over a powdered iron catalyst at temperatures over the range 550 to 670° C. were examined. The data presented in Table VIII below indicates that there is a very narrow temperature window, 600 to 625° C., where the structures of the nanofibers are produced exclusively in the form of platelet structures. Below this temperature the solid carbon product is found to consist of a mixture of herring-bone and platelet conformations, whereas at temperatures of 650° C. there is a tendency for the structures to acquire a tubular arrangement, which becomes the only form at 670° C.

TABLE VIII

Characteristics of carbon nanofibers produced from the iron catalyzed decomposition of a CO/H$_2$ (4:1) mixture as a function of reaction temperature

| Catalyst | Temperature (° C.) | Nanofiber Structure |
|---|---|---|
| Fe | 550 | Herring-bone & Platelet |
| Fe | 580 | Herring-bone & Platelet |
| Fe | 600 | Platelet |
| Fe | 625 | Platelet |
| Fe | 650 | Platelet & Tubular |
| Fe | 670 | Tubular |

EXAMPLE 9

In another series of characterization studies, performed in a high-resolution transmission electron microscope, samples of carbon nanofibers grown from the decomposition of CO/H$_2$ mixtures over a powdered iron-copper (7:3) catalyst at temperatures over the range 550 to 700° C. were examined. The observations from these experiments are presented in Table IX below.

TABLE IX

Characteristics of carbon nanofibers produced from the iron-copper (7:3) catalyzed decomposition of a CO/H$_2$ (4:1) mixture as a function of reaction temperature

| Catalyst | Temperature (° C.) | Nanofiber Structure |
|---|---|---|
| Fe—Cu (7:3) | 550 | Herring-bone & Platelet |
| Fe—Cu (7:3) | 575 | Platelet |
| Fe—Cu (7:3) | 600 | Platelet |
| Fe—Cu (7:3) | 625 | Platelet |
| Fe—Cu (7:3) | 650 | Platelet & Tubular |
| Fe—Cu (7:3) | 670 | Tubular |

What is claimed is:

1. A process for producing a substantially crystalline graphite nanofiber comprised of graphite sheets that are substantially perpendicular to the longitudinal axis of the nanofiber, which process comprises reacting a mixture of CO/H$_2$ in the presence of a Fe:Cu bimetallic catalyst in powder form for an effective amount of time at a temperature from 575° C. to 625° C.

2. The process of claim 1 wherein the ratio of Fe to Cu is from about 1:9 to about 9:1.

3. The process of claim 2 wherein the ratio of Fe to Cu is from about 3:7 to about 7:3.

4. The process of claim 1 wherein the ratio of CO to H$_2$ is from about 95:5 to about 5:95.

5. The process of claim 4 wherein the ratio of CO to H$_2$ is from about 80:20 to about 20:80.

6. The process of claim 3 wherein the ratio of CO to H$_2$ is from about 80:20 to about 20:80.

7. The process of claim 3 wherein the crystallinity of the nanofiber is greater than about 98%.

8. The process of claim 3 wherein the particle size of the bimetallic powder is from about 0.5 nanometer to about 5 micrometer.

9. The process of claim 8 wherein the particle size of the bimetallic powder is from about 2.5 nanometer to about 1 micrometer.

* * * * *